Dec. 28, 1954    R. L. HEIDER ET AL    2,698,337
HYDROCYANATION
Original Filed Aug. 23, 1951    2 Sheets-Sheet 1
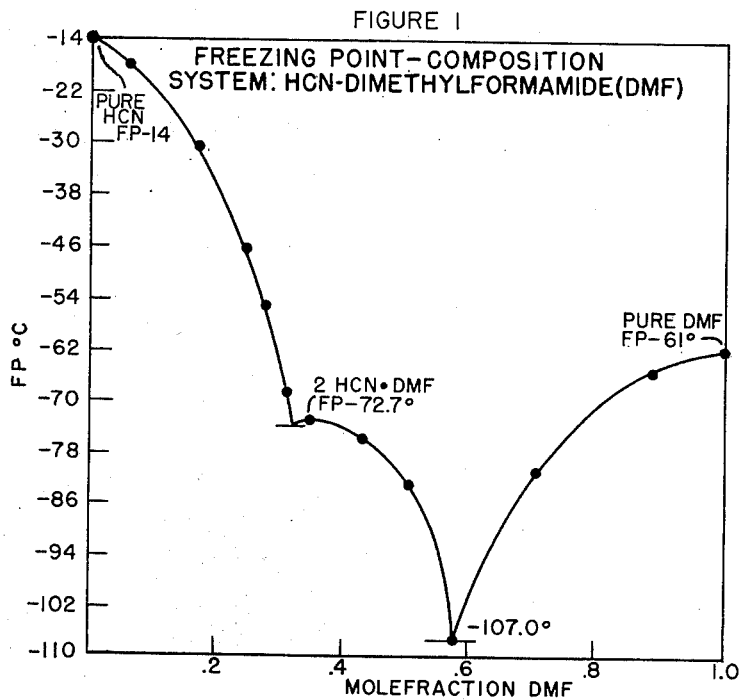
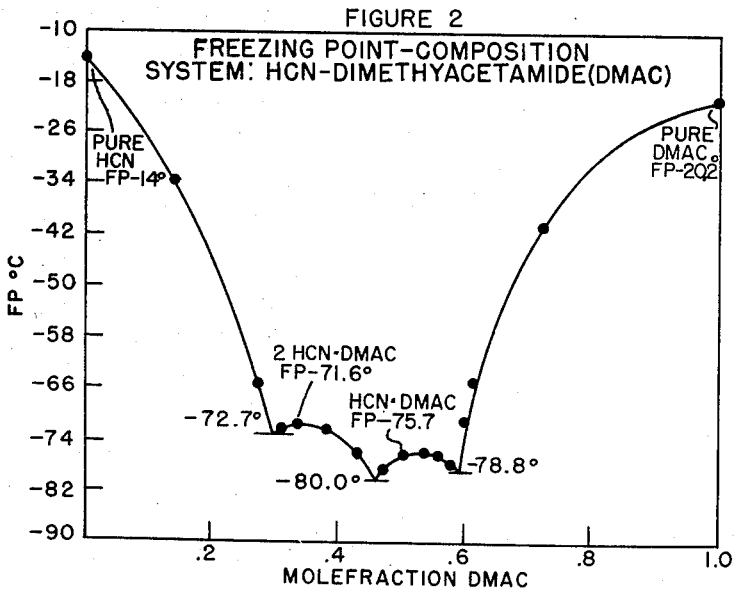
INVENTOR
RUDOLPH L. HEIDER
HARRY M. WALKER
BY
ATTORNEY

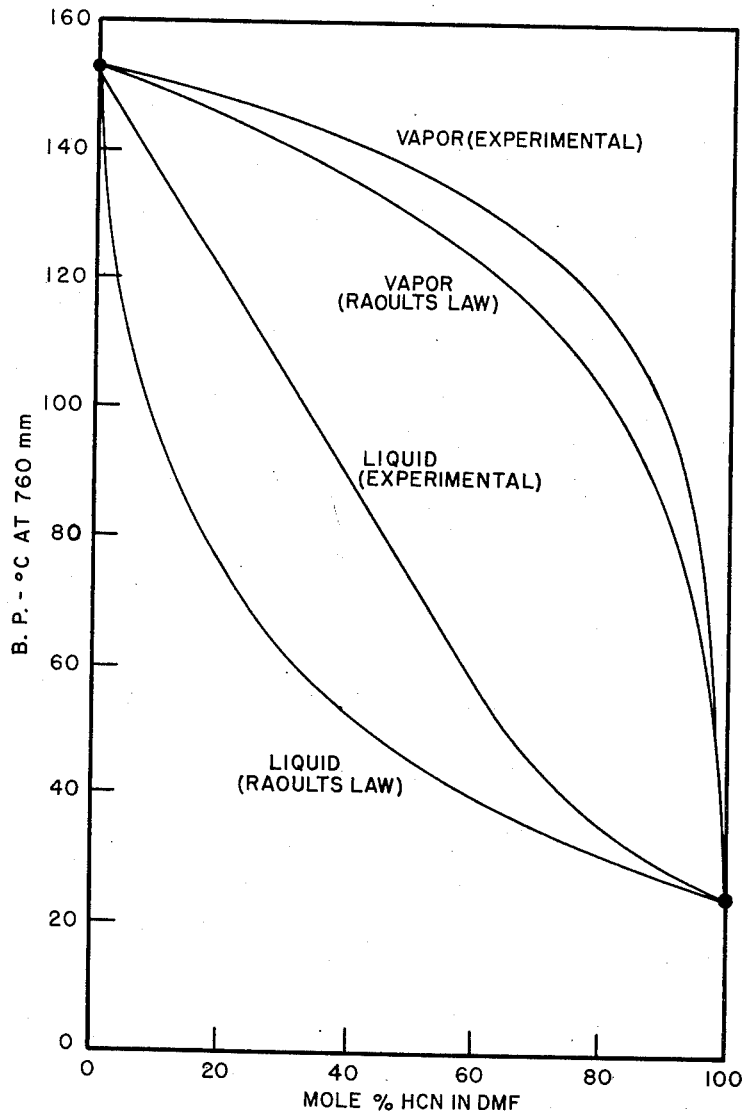

United States Patent Office 2,698,337
Patented Dec. 28, 1954

2,698,337

HYDROCYANATION

Rudolph L. Heider, Texas City, and Harry M. Walker, Dickinson, Tex., assignors to Monsanto Chemical Company, St. Louis, Mo., a corporation of Delaware Original application August 23, 1951, Serial No. 243,212. Divided and this application September 13, 1952, Serial No. 309,532

8 Claims. (Cl. 260—465.8)

The present invention relates to a process of adding hydrocyanic acid to unsaturated organic compounds and comprises the process of hydrocyanating organic compounds such as olefinic and acetylenic compounds by the use of certain hydrocyanic acid-containing systems.

The object of the invention is to provide an improved method of hydrocyanating unsaturated organic compounds. Other objects of the invention will be apparent from the description which follows hereinafter.

Many processes of hydrocyanating unsaturated organic compounds are known in the art. The process of the present invention is novel and by its use the reaction between the unsaturated organic compound and the hydrocyanic acid is facilitated, the reaction period is shortened and certain hydrocyanation reactions can be controlled so as to proceed with a diminished formation of undesirable by-products.

The advantageous results of the present invention depend from the discovery that systems of hydrocyanic acid and N,N-dimethylformamide or N,N-dimethylacetamide, contain molecular complexes of the acid with the amide, and that the presence of such complexes in said systems permits hydrocyanation at temperatures which are higher than those which can be employed in the absence of the molecular complexes.

The term "system" may be defined as the compounds, eutectic compositions, or the mixtures and solutions existing at equilibrum between molecules of hydrocyanic acid and N,N-dimethylformamide or N,N-dimethylacetamide.

The presence of molecular complexes in mixtures of dimethylformamide-hydrocyanic acid or dimethylacetamide-hydrocyanic acid has been established by a variety of observations. For example, when hydrocyanic acid is passed into dimethylformamide or dimethylacetamide, considerable evolution of heat occurs. Similarly there is considerable evolution of heat when dimethylformamide or dimethylacetamide is added to the acid. Actually when one mole of hydrocyanic acid is mixed with one mole of dimethylformamide or with one mole of dimethylacetamide, the heat evolution is 1158 calories and 1396 calories, respectively.

The presence of complexes in the hydrocyanic acid-acylamide systems has also been established by determining the freezing point characteristic thereof and by obtaining liquid-vapor equilibrium data. In the appended drawings, Figures 1 and 2 present freezing point data and Figure 3 presents the liquid-vapor equilibrium data.

Figure 1 shows the freezing point range for the system: hydrocyanic acid-dimethylformamide and indicates a molecular complex of the type $2HCN \cdot HCON(CH_3)_2$ having a freezing point of approximately minus 72.7° C. This material is a crystalline compound. Figure 1 also illustrates the freezing points of compositions containing varying proportions of the molecular complex together with one or the other of its constituent substances. The presence of two eutectics in the system is indicated by the drop of the freezing point curve to the minimum values shown on the diagram.

Figure 2 shows the freezing point range for the system: hydrocyanic acid-dimethylacetamide and indicates molecular complexes of the type $2HCN \cdot CH_3CON(CH_3)_2$ and of the type $HCN \cdot CH_3CON(CH_3)_2$. These complexes have freezing points of minus 71.6° C. and minus 75.7° C., respectively, and are crystalline compounds. Figure 2 also illustrates the freezing points of compositions containing varying proportions of the complexes together with one or the other of its constituent substances. The presence in the system of three eutectics is indicated on the freezing point curve.

Figure 3 illustrates liquid-vapor equilibrium data for the system hydrocyanic acid-dimethylformamide (DMF). Curves derived from experimental data and the theoretical Raoult's law curves are plotted. These data indicate that the system possesses considerably higher boiling points (lower vapor pressures) than is predicted by Raoult's law. Accordingly reaction systems may be employed at higher temperatures than is possible with hydrocyanic acid alone. Since these complexes form in the presence of water or inert organic solvents, aqueous hydrocyanic acid or solutions of this acid in such inert solvents as benzene or ether may be used for their preparation. Determination of the freezing point depression caused by small concentrations of hydrocyanic acid and dimethylformamide or dimethylacetamide in benzene indicates appreciable complex formation at the freezing temperature. Formation of molecular complexes of hydrocyanic acid with dimethylformamide or dimethylacetamide occurs over a wide range of temperature and the complexes exist at temperatures which are above those generally used in hydrocyanating reactions.

In the methods heretofore used for the hydrocyanation of unsaturated organic compounds, the unsaturated compounds are subjected to the action of gaseous or liquid hydrocyanic acid or to solutions of the acid in various solvents which are either miscible or immiscible with the unsaturated compound; for example, in the manufacture of acrylonitrile, acetylene and hydrocyanic acid are passed into aqueous solutions of cuprous salts while in the hydrocyanation of methyl vinyl ketone, reaction of the olefinic compound with hydrogen cyanide is effected in the presence of essentially neutral diluents such as, benzene, toluene, pentane, ether, methylene chloride, etc. In the practice of the present invention the hydrocyanic acid is added to the unsaturated compound in the form of the hydrocyanic acid-acylamide solution described above. The hydrocyanic acid-acylamide systems may also be formed in any order, that is, the acylamide may be added to the substance to be hydrocyanated and thereafter hydrocyanic acid added to the resulting solution or mixture or the reverse procedure may be employed. For certain types of reaction, one of these alternatives may be more advantageous than another.

The process of the invention is applicable to the hydrocyanation of a wide variety of compounds having unsaturation, e. g., mono-olefinic or diolefinic hydrocarbons, acetylene, acetylenic hydrocarbons, saturated or unsaturated aldehydes, ketones, quinones, azomethines, etc.; but it is particularly useful in the addition of hydrocyanic acid with an unsaturated compound selected from the class consisting of (1) acetylenic compounds having the general formula CH:CR in which R is selected from the class consisting of hydrogen and aliphatic hydrocarbon radicals of from 1 to 4 carbon atoms, and (2) aliphatic $\alpha,\beta$-unsaturated compounds in which there is attached to at least one of said unsaturated carbon atoms a radical selcted from the class consisting of —CN, >C=O, and —CH=CH—. Acetylenic compounds which may be hydrocyanated by the present process include, acetylene and vinylacetylene, to give acrylonitrile and cyanobutadiene, respectively. The $\alpha,\beta$-unsaturated aliphatic compounds which may be employed are generally compounds having an activating group attached to the unsaturated carbon atom. The unsaturation may be olefinic or acetylenic. Examples of compounds in which the activating group is the —CN radical are acrylonitrile, and 1-cyanobutadiene-1,3. Compounds containing the >C=O radical attached to the unsaturated carbon atom are e. g. ketones such as methyl vinyl ketone or mesityl oxide, aldehydes such as acrolein, crotonaldehyde, $\alpha,\beta$-mono-olefinic unsaturated acids and esters thereof such as acrylic acid, methyl methacrylate, maleic acid and diethylfumarate, and esters of unsaturated alcohols such as vinylacetate and vinylformate. Unsaturated compounds in which there is attached to at least 1 unsaturated carbon the radical —CH=CH— are dienic or polyolefinic hydrocarbons such as butadiene, cyclopentadiene, hexadiene, etc. The present process is especially to be preferred when working with low boiling materials and particularly with unsaturated compounds selected from the class consisting of α,β-monoolefinic nitriles, ketones and carboxylates of from 3 to 6 carbon atoms.

The hydrocyanation process can be conducted under atmospheric or increased pressure, and in most cases it is advantageous to promote the reaction by heating. The process can be conducted either as a batch or a continuous operation. Catalysts such as inorganic alkalis, metals and metallic salts may be used to facilitate the addition reaction. The unsaturated compounds may be dissolved in a solvent therefor, or they may be reacted in the absence of a solvent. Catalytic materials may be present if desired.

The present process and the beneficial effects of the present hydrocyanic acid-acylamide systems will be more specifically described by reference to the production of succinonitrile.

Preparation of succinonitrile by reaction of acrylonitrile with hydrocyanic acid is described in U. S. Patent No. 2,434,606 and also in German Patent No. 707,852. In these prior processes, good yields of succinonitrile were obtainable only by conducting the reaction for at least about three hours and sometimes for more than 24 hours. The long reaction times employed were necessitated by reason of the volatility of the hydrocyanic acid, making it difficult to retain the said hydrocyanic acid in the liquid phase. The present invention provides a method for substantially decreasing the reaction time without decreasing the yields of succinonitrile thereby obtained.

We have found that by employing a system of hydrocyanic acid and dimethylformamide or dimethylacetamide a substantially quantitative yield of succinonitrile may be obtained in a considerably shorter period of time than was possible in prior art processes.

Prior art processes employing solvents or diluents in this reaction could not result in a short reaction time because of the absence of compounds capable of forming association complexes with hydrocyanic acid.

It has been ascertained that the N,N-dimethylacylamides do not act as catalyzers for the reaction in the ordinary sense of the term. It is, accordingly, necessary that the reaction between acrylonitrile and hydrocyanic acid be catalyzed by alkaline catalyst, for example, such as those disclosed by the prior art patents referred to above. As alkaline catalysts useful for the present reaction we prefer the organic bases such as the secondary and tertiary alkylamines, quaternary ammonium hydroxides, sodium or potassium hydroxides, sodium or potassium cyanide, etc.

The present invention can be adapted for either batchwise or continuous operation. When operating in a batchwise manner, the reactants can be mixed together in any convenient order. In order words, the dimethylacylamide-HCN system, since it is instantaneously formed upon mixing of the ingredients, may be first formed in the reaction zone at the time the reactants are initially brought together. On the other hand, if desired, the dimethylacylamide-HCN system may be first formed in a separate operation and the acrylonitrile added thereto. The alkaline catalyst may be added to the reaction vessel containing the reactants or it may be added to either reactant prior to mixing.

When operating in a continuous manner, the same practice may be followed. However, in this case it is generally more convenient to prepare a mixture of acrylonitrile and hydrocyanic acid in the desired proportions in one vessel and in a second vessel prepare a mixture of the dimethylacrylamide and the alkaline catalyst. Appropriate quantities of the contents of each vessel are passed into a tubular reaction vessel which is surrounded by a heating or cooling jacket. The reaction vessel is of such size as to provide a sojourn time on the order of 5 to 20 minutes, while the capacity of the jacket is of such capacity as to maintain the temperature of the reaction between 70° and 120° C. The reacted mixture is discharged from the reaction zone into a still for recovery of the product in the usual manner.

The reactants may be employed in equimolar proportions, although in the event that one of the reactants is employed in an excess over equimolar proportions with respect to the other, recovery of such excess can be effected at the conclusion of the process. Since the hydrocyanic acid is the most volatile reactant employed and its recovery from the reaction product somewhat difficult as well as hazardous, it is preferred that the acrylonitrile be employed in a slight excess with respect to the hydrocyanic acid supplied. In this manner the hydrocyanic acid is substantially completely used up, so that any difficulties attending the working up and recovery of this reactant are avoided.

The quantity of the dimethylacylamide employed is also somewhat variable; however, for best results there should be sufficient of this material present in the initial reaction mixture to form the above described associated complex. In other words, there should be present at least one half mole of dimethylacylamide per mole of hydrocyanic acid present. On the other hand, there may be present up to as much as 5 to 10 moles of the dimethylacylamide per mole of hydrocyanic acid employed, since the former compound is recovered from the product without significant loss.

The amount of catalyst employed may be from 1% to 20% by weight of the reaction mass; the amount employed not being critical provided that at least catalytic amounts are present. The catalytic material is also recovered without significant loss; and, of course, may be reintroduced into the reaction vessel for catalysis of a subsequent batch.

The following examples illustrate this invention:

*Example 1*

One hundred grams of dimethylformamide and 29 g. of triethylamine were placed in a flask and 106 g. (2 moles) of acrylonitrile and 54 g. (2 moles) of hydrocyanic acid were introduced into an ice-cooled dropping funnel. The contents of the flask were heated to 80° C. and the hydrocyanic-acrylonitrile mixture was dropped in uniformly during 45 minutes. The reaction was exothermic from the start and constant use of the ice bath was required to keep the temperature at 80–90° C. No refluxing of hydrocyanic acid occurred. The mixture was stirred for an additional 40 minutes; however, it was apparent that the reaction had been completed after about 15 minutes. Distillation of the reaction mixture through a 6″ Vigreux column yielded 100 g. of a mixture of dimethylformamide and triethylamine and 144.9 g. of succinonitrile. The yield was 90.5% based on either acrylonitrile or hydrocyanic acid and the recovery of solvent was 99%.

*Example 2*

A mixture consisting of 2.39 moles of acrylonitrile and 2.0 moles of hydrocyanic acid was placed in one vessel, while in another vessel was placed 180.6 g. of dimethylformamide and 7.3 g. of triethylamine. The above liquids were fed into a tubular reaction vessel of such size as to provide a sojourn time therein of 11 minutes. A water jacket surrounding the reactor maintained the temperature of the reaction mixture between 70° and 90° C. The reaction mixture was discharged from the tube into a distillation vessel and then distilled. Distillation of the mixture yielded a light fraction boiling below 142° C. and consisting of acrylonitrile, triethylamine and dimethylformamide and the succinonitrile fraction (B. P. 167–172° C./40 mm. pressure), amounting to 151.6 g. The yield of succinonitrile was 94.6%. The recovery of unreacted acrylonitrile, the triethylamine and dimethylformamide was substantially 100%.

*Example 3*

Dimethylformamide (163.1 g.) and a recovered light fraction (51.2 g.) from a previous run containing acrylonitrile (20.0 g.), triethylamine (14.7 g.), and dimethylformamide (16.3 g.) were fed to the reactor where they mixed with a stream containing 2 moles each of hydrocyanic acid and acrylonitrile. The rate of feeding was such as to afford an average contact time of 10.4 minutes in the reaction vessel. Temperatures in the reactor were 78–88° C. during the run. Distillation of the reactor effluent yielded: (1) light ends 44.6 g., (2) dimethylformamide, 157.5 g. and (3) succinonitrile 153.5 g. (95.9%). The recovery of excess acrylonitrile, triethylamine and dimethylformamide was substantially 100%. This run demonstrates the practicability of recycling the excess acrylonitrile, triethlamine and dimethylformamide with no reduction in yield or material recovery. As many as seven successive runs were made with little or no make-up of these materials.

Example 4

Dimethylformamide (recovered from a previous run) 52.0 g. and a light ends fraction (60.8 g.) from a previous run estimated to contain acrylonitrile (21.0 g.), dimethylformamide (20.0 g.), triethylamine (17.0 g.) and water (20.8 g.) were fed together with a stream containing equivalent amounts (2 moles each) of hydrocyanic acid and acrylonitrile to the tubular reactor. The feed rate was such as to give a contact time of 10.4 minutes. Temperatures along the reactor were 78–91° C. at all points during the run. Distillation of the effluent yielded: (1) light ends 52.1 g., (2) solvent 58.9 g. and (3) succinonitrile 152.1 g. (95.1%). The recovery of excess acrylonitrile, triethylamine and dimethylformamide was 98.5% (without corrections for losses). This run demonstrates that considerably less dimethylformamide (0.5 moles per mole of HCN) can be used without loss of its beneficial effects. However, some boiling of HCN occurred before the reactor was entirely filled with liquid. Recycle materials were also used in this run.

Example 5

This run was essentially identical with the previous one except that dimethylacetamide (72.6 g.) and triethylamine (17.0 g.) were charged to the solvent-catalyst feed vessel. The yield of succinonitrile was 93.0% and the recovery of light ends and dimethylacetamide was 96.3%.

The use of the hydrocyanic acid-dimethylformamide or dimethylacetamide systems for the hydrocyanation of organic compounds gives improved yields in shorter reaction times generally. Thus, the present systems may be used to good advantage in the manufacture of acrylonitrile from acetylene and hydrocyanic acid, in the preparation of 1-cyano-1,3-butadiene and 2,3-dicyano-2-butadiene from vinyl acetylene and hydrocyanic acid, in the preparation of lactonitrile acetate from vinyl acetate and hydrocyanic acid, the preparation of 1-cyano-cyclohexyl acetate from 1-cyclo-hexenyl acetate and hydrocyanic acid, the preparation of levulinonitrile from methyl vinyl ketone and hydrocyanic acid, the preparation of ethyl 2-cyanoacrylate from ethyl propiolate and hydrocyanic acid, etc.

This application is a division of copending application, Serial Number 243,212, filed August 23, 1951.

What is claimed is:

1. The process of facilitating reactions involving the addition of hydrocyanic acid to an $\alpha,\beta$-mono-olefinic aliphatic nitrile which comprises contacting said nitrile with the system: $HCN \cdot RCON(CH_3)_2$ in which R is selected from the class consisting of hydrogen and the methyl radical.

2. The process of facilitating reactions involving the addition of hydrocyanic acid to an $\alpha,\beta$-mono-olefinic aliphatic nitrile which comprises contacting said nitrile with the system: $HCN \cdot HCON(CH_3)_2$.

3. The process of facilitating reactions involving the addition of hydrocyanic acid to an $\alpha,\beta$-mono-olefinic aliphatic nitrile which comprises contacting said nitrile with the system: $HCN \cdot CH_3CON(CH_3)_2$.

4. The process for producing succinonitrile which comprises contacting acrylonitrile with the system: $HCN \cdot RCON(CH_3)_2$ in which R is selected from the class consisting of hydrogen and the methyl radical.

5. The process for producing succinonitrile which comprises contacting acrylonitrile, in the presence of an alkaline catalyst, with the system: $HCN \cdot HCON(CH_3)_2$.

6. The process for producing succinonitrile which comprises contacting acrylonitrile, in the presence of an alkaline catalyst, with the system: $HCN \cdot CH_3CON(CH_3)_2$.

7. The process of producing succinonitrile which comprises treating acrylonitrile, in the presence of an alkaline catalyst, with hydrocyanic acid while dissolved in an amide selected from the group consisting of dimethylformamide and dimethylacetamide.

8. The process of producing succinonitrile which comprises treating acrylonitrile, in the presence of an alkaline catalyst, with hydrocyanic acid while dissolved in an amide selected from the group consisting of dimethylformamide and dimethylacetamide at a temperature in the range of from about 70° C. to about 90° C.

References Cited in the file of this patent

UNITED STATES PATENTS

| Number | Name | Date |
|--------|------|------|
| 2,460,603 | Semon | Feb. 1, 1949 |
| 2,547,686 | Brockway | Apr. 3, 1951 |